(12) United States Patent
Steinborn et al.

(10) Patent No.: US 9,714,703 B2
(45) Date of Patent: Jul. 25, 2017

(54) METHOD FOR CONTROLLING AN AUTOMATED TRANSMISSION

(75) Inventors: Mario Steinborn, Friedrichshafen (DE); Jochen Breuer, Tettnang (DE); Christoph Ruechardt, Bodolz (DE); Thomas Jaeger, Meckenbeuren (DE); Roland Mair, Tettnang (DE); Melchor Moro-Oliveros, Riva del Garda (IT)

(73) Assignee: ZF Friedrichshafen AG, Friedrichshafen (DE)

(*) Notice: Subject to any disclaimer, the term of this patent is extended or adjusted under 35 U.S.C. 154(b) by 928 days.

(21) Appl. No.: 14/001,196

(22) PCT Filed: Mar. 2, 2012

(86) PCT No.: PCT/EP2012/053597
§ 371 (c)(1),
(2), (4) Date: Aug. 23, 2013

(87) PCT Pub. No.: WO2012/139815
PCT Pub. Date: Oct. 18, 2012

(65) Prior Publication Data
US 2014/0020494 A1 Jan. 23, 2014

(30) Foreign Application Priority Data
Apr. 11, 2011 (DE) .................. 10 2011 007 107

(51) Int. Cl.
*F16H 61/00* (2006.01)
*F16H 61/28* (2006.01)
*F16H 61/12* (2010.01)

(52) U.S. Cl.
CPC ..... *F16H 61/0021* (2013.01); *F16H 61/0003* (2013.01); *F16H 61/2807* (2013.01); *F16H 2061/1204* (2013.01); *Y10T 74/20024* (2015.01)

(58) Field of Classification Search
CPC .................. F16H 61/0021; F16H 61/0003
See application file for complete search history.

(56) References Cited

U.S. PATENT DOCUMENTS

| 5,315,972 A * | 5/1994 | Judy .................. B60K 31/00 |
| | | 123/198 D |
| 5,836,207 A | 11/1998 | Spooner et al. |

(Continued)

FOREIGN PATENT DOCUMENTS

| DE | 43 20 353 A1 | 1/1994 |
| DE | 43 09 901 A1 | 9/1994 |

(Continued)

OTHER PUBLICATIONS

German Search Report Corresponding to 10 2011 007 105.9 mailed Jan. 12, 2012.

(Continued)

*Primary Examiner* — William Kelleher
*Assistant Examiner* — Gregory T Prather
(74) *Attorney, Agent, or Firm* — Davis & Bujold. PLLC; Michael J. Bujold

(57) ABSTRACT

A method of controlling an automated transmission with positioning cylinders (6, 8, 20) controlled by shift valves or venting valves (10, 12, 16, 18, 22, 24). At least one cut-off valve (4) is positioned in front of the shift or venting valves and a control device controls the valves while pressure pipes, which follow the cut-off valve (4), are connected with one another following the cut-off valve (4). Due to the fact that the cut-off valve (4), for reasons of design simplicity and cost, is generally designed as a simple 2/2 way valve which only allows pressure increase but not pressure reduction, the method provides control of the shift valves or ventilation or venting valves (16, 18), of a non activated positioning cylinder (8), so that the pressure pipe system is (Continued)

connected with an outflow pipe (14) for a pressure reduction in the pressure pipe system (30, 32, 34).

3 Claims, 1 Drawing Sheet

(56) References Cited

U.S. PATENT DOCUMENTS

| | | | |
|---|---|---|---|
| 6,116,391 | A | 9/2000 | Kremmling et al. |
| 6,694,803 | B2 * | 2/2004 | Klik .................... F15B 11/028 73/1.71 |
| 6,705,175 | B1 * | 3/2004 | Klatt ................... F16H 61/2807 74/335 |
| 7,559,875 | B2 | 7/2009 | Steinhauser et al. |
| 8,078,370 | B2 | 12/2011 | Petzold et al. |
| 8,240,444 | B2 | 8/2012 | Ulbricht et al. |
| 8,366,588 | B2 * | 2/2013 | Gansohr ............... B60W 10/02 192/3.58 |
| 2008/0171633 | A1 | 7/2008 | Gansohr et al. |
| 2010/0051408 | A1 * | 3/2010 | Ulbricht ............. F16H 61/0021 192/85.63 |

FOREIGN PATENT DOCUMENTS

| | | |
|---|---|---|
| DE | 197 54 726 A1 | 6/1999 |
| DE | 696 25 937 T2 | 11/2003 |
| DE | 10 2005 052 824 A1 | 3/2007 |
| DE | 10 2006 009 609 A1 | 9/2007 |
| DE | 10 2006 031 380 A1 | 1/2008 |
| DE | 10 2006 031 382 A1 | 1/2008 |
| DE | 10 2006 040 476 A1 | 3/2008 |
| DE | 196 80 781 B4 | 4/2008 |
| DE | 10 2006 054 032 A1 | 5/2008 |
| EP | 1 055 847 A2 | 11/2000 |
| GB | 2 354 295 A | 3/2001 |
| GB | 2 369 657 A | 6/2002 |
| WO | 2007/099035 A1 | 9/2007 |
| WO | 2008/058856 A1 | 5/2008 |

OTHER PUBLICATIONS

German Search Report Corresponding to 10 2011 007 107.5 mailed Dec. 5, 2011.
International Search Report Corresponding to PCT/EP2012/053594 mailed May 30, 2012.
International Search Report Corresponding to PCT/EP2012/053597 mailed May 7, 2012.
Written Opinion Corresponding to PCT/EP2012/053594 mailed May 30, 2012.
Written Opinion Corresponding to PCT/EP2012/053597 mailed May 7, 2012.

* cited by examiner

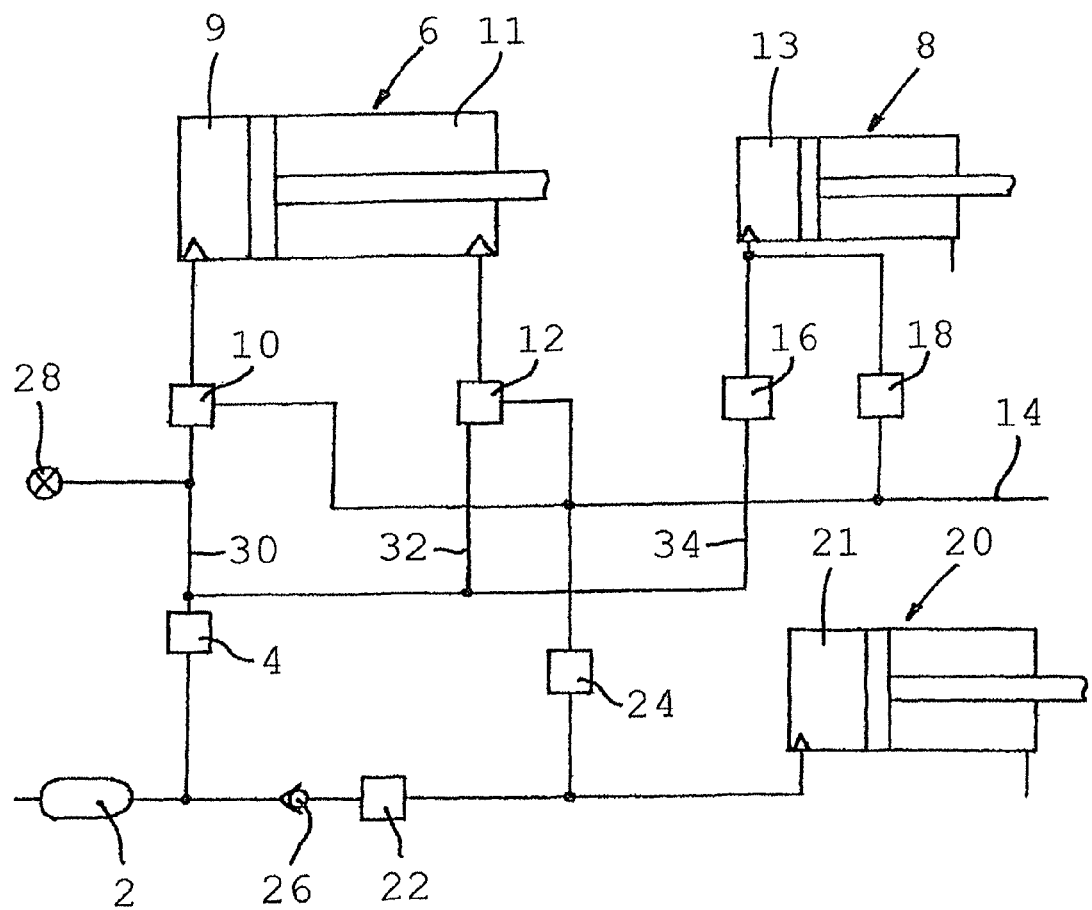

METHOD FOR CONTROLLING AN AUTOMATED TRANSMISSION

This application is a National Stage of PCT/EP2012/053597 filed Mar. 2, 2012, which claims priority from German patent application serial no. 10 2011 007 107.5 filed Apr. 11, 2011.

FIELD OF THE INVENTION

The invention concerns a method for controlling an automated transmission.

BACKGROUND OF THE INVENTION

Automated shift transmissions have been used in different types of motor vehicles for quite some time. The shift movements to shift the gear steps, to activate the clutches and transmission brakes, are generally executed by pressure means activated positioning cylinders.

Such shift transmissions at least partially use the supply pressure of a vehicle in which they are installed. The shift elements, meaning the main cut-off valves and, thereafter, the following shift valves, are directly supplied with either this supply pressure or system pressure, respectively, of the vehicle, or supplied with a constant operating pressure by means of pressure reduction valves, for instance. That means that the load of the shift elements, the shift timing, the shift noise, etc., cannot, or only to a lesser extent, be influenced.

Already known through DE 10 2006 040 476 A1 is a hydraulic or a pneumatic control device, for an automated shift transmission, in which the pressure is controllable in a gear shift mechanism space, designed as a pressure storage, which is positioned and installed prior to the main cut-off valve or main-cut-off valves. Hereby, prior to a shift operation, the varying pressure means requirement is estimated or a pressure drop in the system is determined by means of a pressure sensor and, depending on the pressure means requirement, one, two or several parallel main cut-off valves will be opened to satisfy this pressure means requirement. However, as the pressure means requirement is estimated, this method is not accurate or the control of the main cut-off valves happens too late because it can only happen after it is executed, measured by the pressure sensor, then the pressure drop in the system takes place. Mainly, the known method does not allow any variable matching of the supply pressure for the respective special requirements for a certain shift scenario.

In particular, in shift transmissions of the art, which is mentioned in the generic term of the claim 1 in which the main cut-off valve or main cut-off valves, respectively, are designed as 2/2 way valves due to design simplicity, a further disadvantage can be seen in the fact that the shift device for the pressure regulation, which is positioned after the main cut-off valves, can only receive an injected pressure but the pressure cannot be lowered and thus, a further optimization of the shift transmission and its functions which requires such a pressure reduction, is not possible.

SUMMARY OF THE INVENTION

With that background, the invention has the task of creating a method of controlling an automatic shift transmission which makes a further optimization, in the above mentioned sense, possible through simple means.

The invention is based on the findings that the pressure chambers of the positioning cylinders, which follow the main cut-off valves, are connected, on one hand, via assigned shift valves or ventilation valves, respectively, and, on the other hand, via interconnected pressure or inflow pipes as well as via the shift valves or ventilation valves, respectively, with a pressure outflow pipe, so that a pressure reduction of the pressure inflow pipes is possible through each positioning cylinder.

Thus, the invention is based on a method of controlling an automatic shift transmission with several pressure means activated positioning cylinders through assigned shift valves or ventilation or venting valves, respectively, one or more main cut-off valves which are positioned prior to the shift valves or ventilation or venting valves, respectively, and with a control device for controlling these valves, whereby the pressure pipes, which follow the main cut-off valves, are connected with one another.

In this method, it is provided to solve the given task that, for the purpose of the pressure reduction in the pressure pipe system which follows after the respective main cut-off valves, the shift valves or ventilation or venting valves, respectively, of each actually not to be activated positioning cylinders are triggered in a way that the pressure type is connected with a pressure means outflow pipe.

It is hereby to be taken into consideration that the mentioned valves, for the not to be activated positioning cylinders, are controlled in a way that they are not adjusted to an undesired position.

Modern shift transmissions generally have at least a transmission brake which is activated by a one side operating positioning cylinder and its pressure chamber is filled or vented, respectively, by a first way valve, and which is vented, by a second way valve. In accordance with a preferred embodiment of the inventive method, it is provided that the first way valves and the second way valves of the transmission brake, for the purpose of a pressure reduction in the mentioned pressure pipe system, are each shifted into a position which allows a pressure means flow so that the pressure pipe system can be short-circuited with the pressure means outflow pipe and which is hereby vented. Naturally, it is hereby required that the transmission brake is then actually not to be activated.

BRIEF DESCRIPTION OF THE DRAWING

The description has a drawing attached to it for a further explanation of the invention. It shows schematically a shift scheme for the execution of the inventive control method.

DETAILED DESCRIPTION OF THE PREFERRED EMBODIMENTS

The shift system, which is presented in the drawings as a pneumatic shift system for shifting an automated shift transmission for commercial vehicles for instance, is supplied with a pressure means by a pressure means supply system which is part of the vehicle, and which has a pressure means supply container 2.

In the present exemplary case, the shift system comprises of a pressure means supply container 2, followed by a main cut-off valve 4 which can connect or separate a following shifting configuration with the pressure means supply container 2. It is also noted here that several parallel positioned main cut-off valves can be provided, instead of the main cut-off valve 4.

In the presented case, the following shifting configuration comprises two positioning cylinders 6 or 8, respectively, whereby the first positioning cylinder 6 is a dual-functioning positioning cylinder, for the selection of a gear step or a shifting path for instance, and the second positioning cylinder 8 is a single-side functioning positioning cylinder, for a transmission brake.

The two pressure chambers 9 and 11 of the first positioning cylinder 6 are each filled by means of an assigned 3/2 way valve 10 or 12, respectively, or vented via a pressure or means outflow pipe 14, while the only pressure or chamber 13 of the second positioning cylinder 8 is filled by means of the 2/2 way valve 16 and is vented by means of a 2/2 way valve 18, via the pressure means outflow pipe 14. The 3/2 way valves 10 and 12 are also called shifting valves, and the 2/2 way valves 16 and 18 are also called ventilation and venting valves.

Here, the shift system also comprises a third single-side functioning positioning cylinder 20 which serves for the actuation of a transmission clutch. The only pressure chamber 21, of the third positioning cylinder 20, is respectively filled or vented via a 2/2 way valve 22 and vented via a 2/2 way valve 24, by the pressure means outflow pipe 14.

The 2/2 way valve 22 has a check valve 26 positioned in front of it for filling of the clutch positioning cylinder 20 to avoid venting of the clutch positioning cylinder 20, during a drop of the pressure supply.

The 3/2 and 2/2 way valves 10, 12, 16, 18, 22, 24 and, in particular, the main cut-off valve 4, which are assigned to the positioning cylinders 6, 8, 20, are triggered via a control device which for clarity reasons, is not shown here. A pressure sensor 28, which follows after the main cut-off valve 4, collects the nominal pressure in the shifting configuration and feeds a respective signal to the control device.

For instance, if the pressure in the pressure pipe system which is positioned after the man cut-off valves 4, meaning the interconnected pressure pipes 30, 32, 34, needs to be lowered, the ventilation and venting valves 16 and 18 are each preferably switched into a position, for a short time under the assumption that the transmission brake (positioning cylinder 8) is not activated, which allows a pressure flow rate such that the entire pressure pipe system is connected with the pressure means outflow pipe and is vented to a point where the desired pressure adjusts itself.

REFERENCE CHARACTERS

2 Pressure Means Supply Container
4 Main Cut-Off Valve
6 Positioning Cylinder
8 Positioning Cylinder
9 Pressure Chamber
10 3/2 Way Valve
11 Pressure Chamber
12 3/2 Way Valve
13 Pressure Chamber
14 Pressure Means Outflow Pipe
16 2/2 Way Valve
18 2/2 Way Valve
20 Positioning Cylinder
21 Pressure Chamber
22 2/2 Way Valve
24 2/2 Way Valve
26 Check Valve
28 Pressure Sensor
30 Pressure Pipe
32 Pressure Pipe
34 Pressure Pipe

The invention claimed is:

1. A method of controlling an automated transmission comprising:
   a first positioning cylinder (6) being a dual functioning positioning cylinder having a pair of 3/2 valves (10, 12);
   a second positioning cylinder (8) being a single functioning positioning cylinder and having first and second 2/2 valves, and the first 2/2 valve (16) facilitates filling of the second positioning cylinder (8) and the second 2/2 valve (18) facilitates venting of the second positioning cylinder (8);
   a third positioning cylinder (20) being a single functioning positioning cylinder, configured to actuate a clutch and having a third and fourth 2/2 valves, and the third 2/2 valve (22) facilitates filling of the third positioning cylinder (20) and the fourth 2/2 valve (24) facilitates venting of the third positioning cylinder (20);
   at least one main cut-off valve (4) being positioned upstream of the 2/2 and the 3/2 valves (10, 12, 16, 18, 22, 24), and
   a control device for controlling the 2/2 and 3/2 valves, the method comprising the steps of:
   connecting a plurality of pressure pipes with one another to facilitate a pressure reduction in a pressure pipe system (30, 32, 34) which follows the at least one main cut-off valve (4), and
   controlling the 2/2 and the 3/2 valves so that the pressure pipe system is vented via a pressure outflow pipe (14) for facilitating the pressure reduction in the pressure pipe system.

2. The method according to claim 1, further comprising:
   providing the transmission with at least a transmission brake which is activated by the second functioning positioning cylinder (8),
   filling the second functioning positioning cylinder (8) via the first 2/2 valve (16) and venting the second functioning positioning cylinder (8) via the second 2/2 valve (18), and
   switching each of the first 2/2 valve (16) and the second 2/2 valve (18) into a position which facilitates the pressure reduction without actuating the second positioning cylinder (8).

3. A method of controlling an automated transmission comprising:
   a plurality of pressure pipes;
   a pressure outflow pipe;
   a first positioning cylinder being a dual functioning positioning cylinder having a pair of 3/2 valves;
   a second positioning cylinder being a single functioning positioning cylinder, configured to act as a transmission brake and having first and second 2/2 valves, and the first 2/2 valve facilitates filling of the second positioning cylinder and the second 2/2 valve facilitates venting of the second positioning cylinder;
   a third positioning cylinder being a single functioning positioning cylinder, configured to actuate a clutch, and having third and fourth 2/2 valves, and the third 2/2 valve facilitates filling of the third positioning cylinder and the fourth 2/2 valve facilitates venting the third positioning cylinder;
   at least one main cut-off valve being positioned upstream of the 2/2 and 3/2 valves;
   a pressure sensor located downstream from the at least one cut-off valve for measuring a system pressure;
   a check valve located upstream from the third positioning cylinder to avoid venting of the third positioning cylinder in response to a drop in the system pressure; and a control device in communication with the pressure sensor for controlling the pairs of 3/2 valves, the first, the second, the third and the fourth 2/2 valves;

wherein when the pressure sensor indicates a need to lower the system pressure in the plurality of pressure pipes, the control device switches the first 2/2 valve and the second 2/2 valve into a position such that the system pressure is vented, via the pressure outflow pipe, while the second positioning cylinder is not actuated to lower the system pressure to a desired system pressure.

* * * * *